Dec. 21, 1965  J. L. ROSHALA  3,225,228
LINEAR MAGNETIC DRIVE SYSTEM
Filed Oct. 10, 1963  2 Sheets-Sheet 1
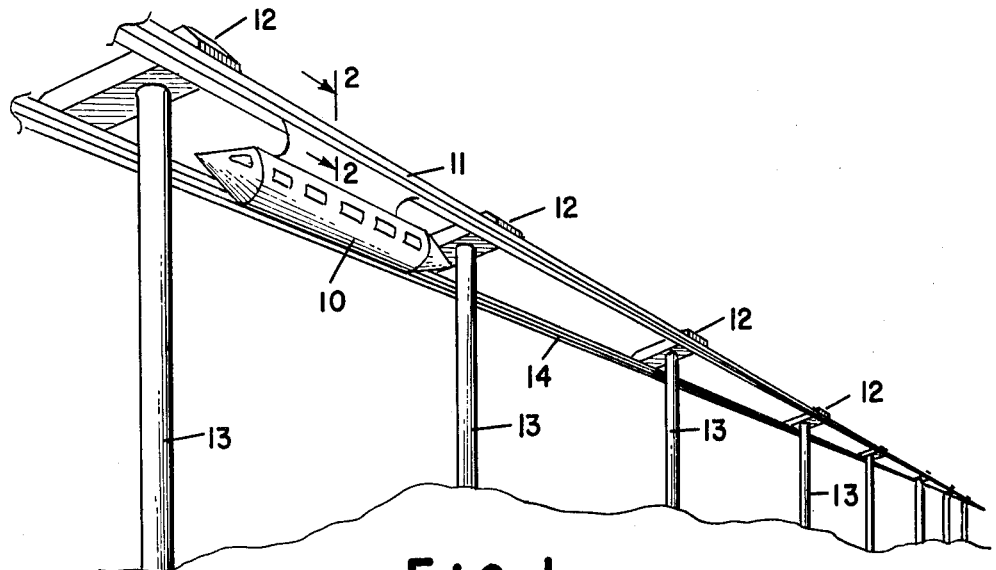
FIG. 1.
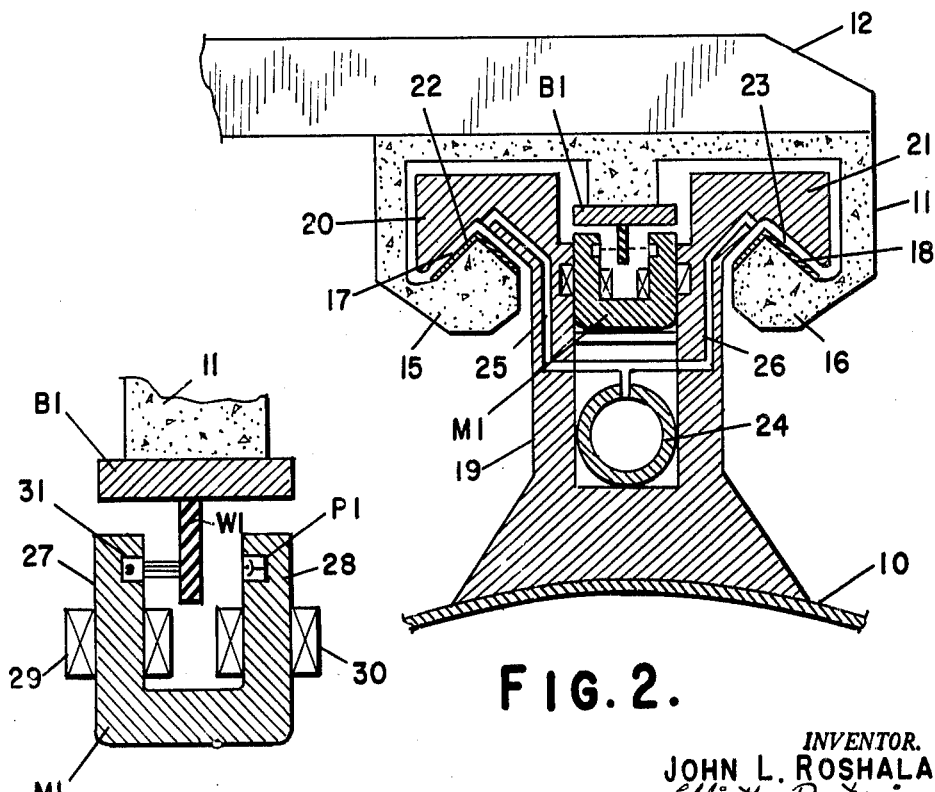
FIG. 2.
FIG. 3.
INVENTOR.
JOHN L. ROSHALA
BY 
ATTORNEYS Dec. 21, 1965  J. L. ROSHALA  3,225,228

LINEAR MAGNETIC DRIVE SYSTEM

Filed Oct. 10, 1963  2 Sheets-Sheet 2

INVENTOR.
JOHN L. ROSHALA
BY Elliott & Pastoriza
ATTORNEYS

United States Patent Office 3,225,228
Patented Dec. 21, 1965

3,225,228
LINEAR MAGNETIC DRIVE SYSTEM
John L. Roshala, 3646 Big Dalton Ave.,
Baldwin Park, Calif.
Filed Oct. 10, 1963, Ser. No. 315,252
3 Claims. (Cl. 310—12)

This invention relates generally to magnetic drive systems for moving one member relative to another and more particularly, to an improved linear magnetic drive for moving a vehicle along a stationary track to provide an improved transportation system.

Conventional electrical drive systems particularly for transporting vehicles in dual or monorail systems usually include an electrical motor. This motor may be powered from electrical energy picked up from the track or, alternatively, by a diesel engine and electric generator carried in the vehicle.

In the case of electrical motors receiving their power from the tarcks, the tracks themselves must be electrified. When great distances are involved, electrification of a track or monorail system is not only extremely expensive but in addition requires costly maintenance. In the event a passive or inert track structure is used and a diesel-electric power plant employed, theer results the inefficiency of converting diesel fuel into electrical power and then using the electrical power to drive the vehicle motor.

In addition to the foregoing, in both previous systems there is the usual friction involved in wheels operating on rails. This friction tends to limit the maximum speed of the vehicle. Moreover, the wear on the tracks requires maintenance of the track system at periodic intervals.

With all of the foregoing in mind, it is a primary object of this invention to provide an improved drive means for moving a vehicle with respect to a stationary track structure in which the foregoing problems are substantially eliminated.

More particularly, it is an object to provide an electromagnetic drive system in which no electrification of the track structure itself is necessary.

Another object is to provide an electro-magnetic dirve system for a vehicle in which electro-magnetic energy is employed directly for the drive and the active components thereof are wholly contained within the vehicle to the end that intermediate conversion of energy such as diesel or gasoline fuel into electrical energy is avoided so that a more efficient system results.

Still another important object is to provide an improved vehicle supporting means in combination with an electro-magnetic drive system in which friction resulting from conventional type wheel and rail supports is substantially eliminated so that greater speeds may be achieved than has been possible heretofore.

More general objects of this invention are to provide an improved transportation system for hauling freight or passengers over long distances at extremely high speeds and in an extremely efficient manner as compared to conventional transportation systems.

Briefly, these and many other objects and advantages of this invention are attained by employing a linear magnetic drive system. Toward this end, there are provided a plurality of magnetically responsive bars evenly spaced along a stationary track structure. The vehicle or other moving member in turn includes a plurality of electromagnets evenly spaced along and carried by the member juxtaposed the series of bars. The member itself is supported on a thin air cushion above the stationary track structure and includes wholly within the moving member itself suitable control means for sequentially energizing the electro-magnets to attract successive bars and effect movement of the vehicle. The vehicle is capable of both forward and reverse motions at varying speeds depending upon certain settings within the control system. In addition, the same electro-magnets and bars may be used to effect dynamic braking of the vehicle.

A better understanding of the invention as well as various additional features and advantages thereof will be had by now referring to one preferred embodiment thereof as illustrated in the accompanying drawings, in which:

FIGURE 1 is a fragmentary perspective view of a transportation system incorporating the linear magnetic drive of the present invention;

FIGURE 2 is an enlarged fragmentary cross-section of a portion of the system taken in the direction of the arrows 2—2 of FIGURE 1;

FIGURE 3 is a further enlarged schematic diagram of a portion of the structure illustrated in FIGURE 2;

Figure 4:
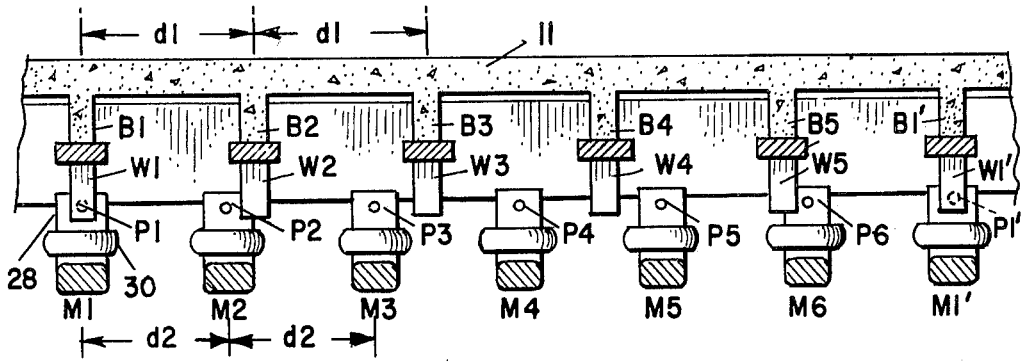
FIGURE 4 is another fragmentary schematic diagram useful in explaining the operation of the linear magnetic drive.

Referring first to FIGURE 1, there is shown a movable member such as a car or vehicle 10 supported by and movable along a track structure 11. As shown, the track structure may be periodically supported by cross-beams 12 secured to the upper ends of vertical columns 13. By this overhead arrangement, the level of the terrain is unimportant since the length of the columns 13 may be adjusted to accommodate ground level variations with the track structure 11 maintained substantially level. A return track structure 14 is illustrated as being secured to the opposite ends of the cross-beams 12.

Referring now to FIGURE 2, one means for supporting the vehicle 10 above the track structure 11 is illustrated. As shown, the track structure includes downwardly depending and inwardly directed structures 15 and 16 terminating in inverted V-shapes in cross-section suitably lined with smooth coatings 17 and 18 forming the bases for an air cushion. The vehicle 10 in turn includes an upwardly extending supporting structure 10 including outwardly directed air cushion supports 20 and 21 terminating in inverted V-shaped channels in cross-section disposed above the track structures 17 and 18 to define small air gaps 22 and 23 therebetween. These air gaps are provided with compressed air from any suitable source such as a compressor or a tank 24 carried in the overhead structure of the vehicle 10. Toward this end, there are provided small passages 25 and 26 for passing air from the tank 24 to the small air gaps 22 and 23 so that the entire vehicle is floated on a cushion of air.

The upwardly extending vehicle structure 19 also includes part of the linear magnetic drive system. This system includes a plurality of electro-magnets such as horseshoe type magnets, one of which is illustrated in cross-section at M1. These magnets cooperate with a plurality of magnetically attractive bars evenly spaced along the track structure, one of which is indicated at B1.

With particular reference to FIGURE 3, the electromagnet M1 includes upstanding legs 27 and 28 provided with energizing coils 29 and 30. Also included in the legs is a small light source 31 and photoelectric cell P1 opposing each other in the opposite legs 27 and 28 respectively. Each of the magnetically responsive bars such as B1 includes a downwardly depending opaque wall or shield W1 extending sufficiently to intercept the light from the source 31 falling on the photoelectric cell P1 when the magnet M1 is exactly juxtaposed to the bar B1.

With particular reference to FIGURE 4, there is shown in side cross-sectional view the plurality of bars B1, B2, B3, B4, B5 secured to the stationary track structure 11 and evenly spaced therealong, the spacing between each of these bars being designated $d1$. Also shown in FIGURE 4 are the plurality of electro-magnets M1, M2, M3, M4, M5, M6, also evenly spaced along the vehicle in a direction parallel to the direction of the track 11. However, the distance between each of the electro-magnets designated $d2$ is different from the spacing $d1$ for the bars.

Also shown in FIGURE 4 for each of the bars are the opaque walls or shields W1, W2, W3, W4, W5. As stated, these shields are respectively arranged to intercept the light passing to the photocells only when the magnets are exactly juxtaposed to the bars. The respective photocells are illustrated as P1, P2, P3, P4, P5, P6 for the magnets M1 through M6.

In the preferred embodiment of the invention, the spacing $d1$ between the respective bars is greater than the spacing $d2$ between the magnets. In fact, the spacing $d1$ between the bars preferably lies between one and one and one-half times the spacing between the magnets. With the dimensions $d1$ and $d2$ as described, every "$n$th" magnet will be juxtaposed one of the bars wherein $n$ is an integer greater than 2. If the spacing $d1$ is approximately six-fifths of the spacing $d2$, then every sixth magnet will be eactly juxtaposed to a bar and "$n$" will be equal to six. In the illustrative embodiment of FIGURE 4, M1 is shown exactly juxtaposed to the bar B1 and the $n$th magnet designated M1' is shown exactly juxtaposed the bar B1'.

The plurality of magnets may then be treated as formed in groups of six magnets every sixth magnet in the entire series being juxtaposed every fifth bar.

In the case of a transportation system, each vehicle may include one or more groups of magnets so that each car in a train will have at least one magnet juxtaposed to one of the bars.

It will be evident from FIGURE 4 that if the magnet M2 is energized and all of the remaining magnets de-energized, it will be drawn to the bar B2 thereby resulting in the vehicle moving to the right as viewed in FIGURE 4. If, after the magnet M2 is exactly juxtaposed the bar B2, the magnet M3 is caused to be energized and the magnet M2 de-energized, the vehicle will again be attracted to the right, the magnet M3 being attracted to the bar B3. When the magnet M3 is then juxtaposed the bar B3, if it is caused to be de-energized and the magnet M4 caused to be energized, further motion will take place. If the corresponding magnets in the next group are simultaneously energized and de-energized as described, a progressive pulling will be effected on the vehicle.

Figure 5:
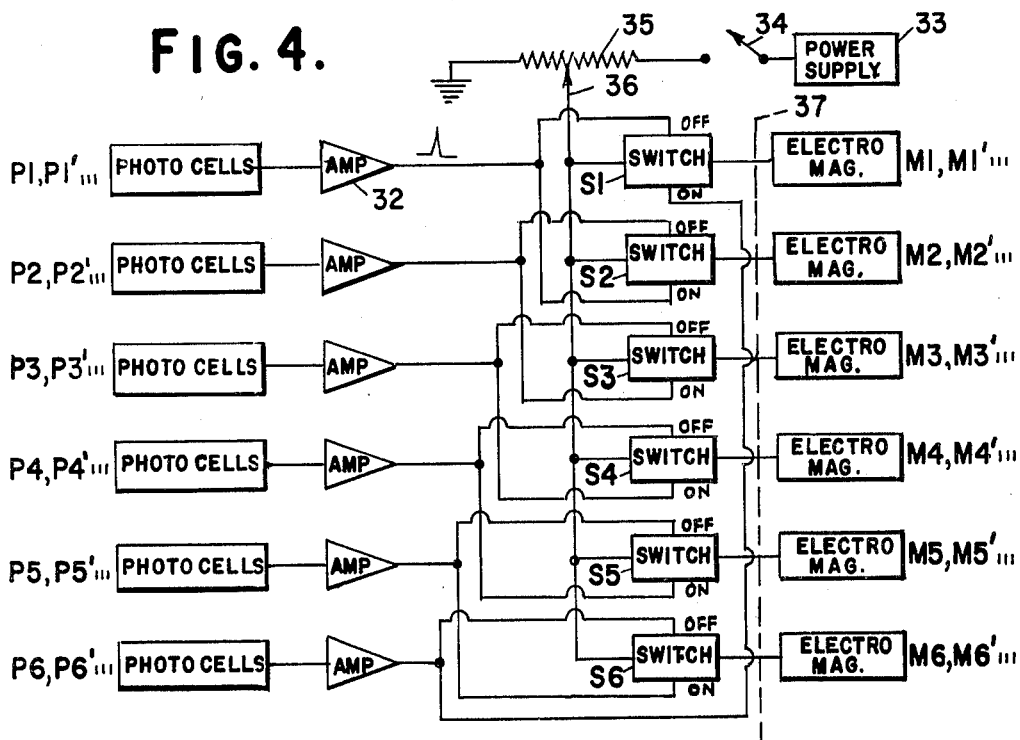
FIGURE 5 is a block diagram showing one type of synchronizing means constituting a control circuit for the various electro-magnets illustrated in FIGURE 4; and, FIGURE 6 is a simple schematic diagram of one type of reversing switch structure.

One type of control system for energizing and de-energizing the magnets in proper sequential manner is illustrated in FIGURE 5. As shown, the signals from the various photocells P1, P2, P3, P4, P5 and P6 are fed into a corresponding number of amplifiers one of which is indicated as 32 to provide an output amplifier triggering signal. These triggering signals are only generated when the light from the light source to the photocell is interrupted or broken as by interception of the opaque shield or wall from one of the bars. As shown, the triggering signals are arranged to be passed into a plurality of switches, S1, S2, S3, S4, S5 and S6. These switches may be mechanical relay type switches, vacuum type switches such as thyratrons, or solid state switching systems. Each of the switches includes an "off" input and an "on" input as labeled. When a trigger signal is received in the "off" input, the switch is opened and when the trigger signal is received at the "on" input the switch is closed.

Referring to the upper right hand portion of FIGURE 5, there is provided a power supply 33, an on-off switch 34, and rheostat 35. A tap from the rheostat 35 is illustrated at 36 for feeding adjustable power to the various switches. When any one of the switches is closed, this power is passed to one of the electro-magnets M1 through M6.

In operation, the output signal resulting from interception of the opaque shield to block light from photocell P1 is amplified in the amplifier 32 to provide a triggering signal which will turn off the switch S1 and simultaneously through the branch lead turn on the switch S2. Thus, when the photocell P1 is de-energized as a consequence of interception of the opaque shield, the magnet M1 is de-energized and the magnet M2 energized. Since the "$n$th" or sixth magnet M1' illustrated in FIGURE 4 has its photocell P1' interrupted at the same time the photocell P1 for the magnet M1 is interrupted, the output signal from P1' may be applied through the same amplifier 32 to the switches S1 and S2 to energize and de-energize respectively the corresponding successive magnets in the next group, M1', M2'.

Similarly, when the photocell P2 is de-energized, the resulting triggering signal will turn off the switch S2 and turn on the switch S3 thereby de-energizing M2 and energizing the magnet M3. The process is continued until the cell P6 provides a trigger signal at which time the switch S6 is turned off and the switch S1 turned on. The next signal received from P1 then starts the sequence over again.

The magnetic force may be controlled by the power passed to the electro-magnets which in turn is controlled by the rheostat 35 and tap 36. Thus the acceleration and speed of the vehicle may be controlled by the rheostat.

Figure 6:
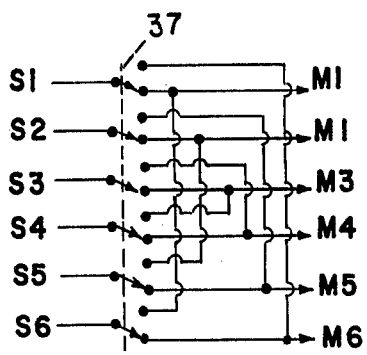

In the event it is desired to reverse the direction of the vehicle, a simple reversing switch schematically illustrated in FIGURE 5 at 37 and diagrammatically disclosed in FIGURE 6, may be used. When the reversing switch 37 is operated, the various switch arms from the switches S1 through S6 are moved to the upper contacts illustrated in FIGURE 6 so that the switch S1 will now cause the magnet M6 to be deenergized and energization of the switch S2 will cause the magnet M5 to be energized thereby moving the vehicle in an opposite direction.

The reversing switch may also be employed as a simple dynamic brake. If the motion of the vehicle is in one direction, by throwing the reversing switch, a magnetic drag will be exerted on the vehicle to stop the same. The degree of braking again can be controlled by the rheostat 35 and tap 36.

From the foregoing description, it will be evident that the present invention has provided a greatly improved linear magnetic drive for any suitable use such as in a transportation system. In combination with the air cushion support for the vehicle, there is essentially only aerodynamic friction to overcome. Further, it should be noted that the track structure including the bars are entirely passive elements, no power being necessarily supplied thereto. The photocell control, which has been given merely by way of example, is wholly contained within the vehicle itself.

Thus, the various objects heretofore set forth are fully realized by the system of the present invention.

While a photocell type control including cooperating means in the form of the opaque shield or wall W1 and the photocell and light source have been described as a means for providing a control system in response to juxtaposition of a magnet with a bar, an equivalent means, such as a change in reluctance or capacitance could be employed. However, it is preferable to use one of these latter type means rather than any mechanical type trip as such mechanical tripping devices become worn and contribute to friction of movement of the vehicle.

While only one preferred embodiment of the invention has been shown, and described, various changes and modifications falling clearly within the scope and spirit of the invention will occur to those skilled in the art. The linear magnetic drive system is therefore not to be thought of as limited to the particular embodiment set forth merely for illustrative purposes.

What is claimed is:

1. A linear magnetic drive system for moving a member relative to a stationary structure, comprising, in combination: a plurality of stationary magnetically responsive bars evenly spaced along a given direction and supported by said stationary structure; a plurality of electromagents evenly spaced along in a direction parallel and adjacent to said given direction and supported by said member, the spacing between said bars being different from the spacing between said electro-magnets; and switch means responsive to the juxtaposition of any one magnet to any one bar to de-energize said one magnet and substantially simultaneously energize the next successive magnet whereby said next successive magnet will be attracted to the next successive bar following said one bar, said switch means including first cooperating means on said stationary structure and second cooperating means on said member; signal generating means connected to said second cooperating means and responsive to juxtaposition of said first and second cooperating means to provide triggering signals; a power supply; a plurality of switches connected between said power supply and said magnets; and means passing said triggering signals to said switches to effect said de-energization of one magnet and energization of said next successive magnet to move said member relative to said stationary structure.

2. A drive means according to claim 1, including reversing switch means for changing the connections of said first mentioned switch means so that the magnet preceding said one magnet is energized in response to juxtaposition of said one magnet with said one bar when said reversing switch means is operated whereby said member is driven in an opposite direction.

3. A drive means according to claim 1, in which said first cooperating means comprises an opaque shield and said second cooperating means includes a light source and photoelectric cell positioned such that said opaque shield intercepts light passing from said source to said cell when said one magnet is juxtaposed said one bar, said signal generating means being responsive to blocking of light passing to said cell to generate said triggering signals.

References Cited by the Examiner
UNITED STATES PATENTS

| | | | |
|---|---|---|---|
| 776,826 | 12/1904 | Caldwell | 310—13 |
| 964,498 | 7/1910 | Dean | 310—12 |
| 3,013,505 | 12/1961 | Burke | 104—134 |

ARTHUR L. LA POINT, *Primary Examiner.*

EUGENE G. BOTZ, *Examiner.*